United States Patent
Schaefers et al.

(10) Patent No.: US 6,940,247 B2
(45) Date of Patent: Sep. 6, 2005

(54) PHASE-SAVING LOWPASS FILTERS FOR DRIVE CONTROL IN CONJUNCTION WITH A HIGH LEVEL OF CONTROL DYNAMICS

(75) Inventors: Elmar Schaefers, Nuremberg (DE); Hans-Peter Troendle, Forchheim (DE)

(73) Assignee: Siemens Aktiengesellschaft (DE)

( * ) Notice: Subject to any disclaimer, the term of this patent is extended or adjusted under 35 U.S.C. 154(b) by 134 days.

(21) Appl. No.: 09/918,872

(22) Filed: Jul. 31, 2001

(65) Prior Publication Data

US 2002/0140394 A1 Oct. 3, 2002

(30) Foreign Application Priority Data

Nov. 17, 2000 (DE) .......................................... 100 57 025

(51) Int. Cl.⁷ ............................................. G05B 11/36
(52) U.S. Cl. ....................... 318/609; 318/432; 318/424; 318/560; 318/567; 318/610; 318/700

(58) Field of Search .................................. 318/609, 432, 318/434, 254, 561, 610, 611, 615, 616, 629, 632

(56) References Cited

FOREIGN PATENT DOCUMENTS

DE          10056199          7/2001

*Primary Examiner*—Robert Nappi
*Assistant Examiner*—Tyrone Smith
(74) *Attorney, Agent, or Firm*—Baker Botts LLP

(57) ABSTRACT

The PDT2 filtering element (PDT2) and a Cauer filter (C2) are employed for use in control tasks of automation engineering, in particular for a filter connected downstream of a rotational speed controller. For tasks in control engineering, these have the advantage of a higher level of robustness, since a large frequency range is filtered, and a substantially smaller phase drop than conventional lowpass filters (PDT2). Consequently, by comparison with the known prior art a loss in dynamics is substantially minimized with these phase-saving lowpass filters, and an optimum is achieved in robustness and dynamics.

6 Claims, 4 Drawing Sheets

_US 6,940,247 B2_

PHASE-SAVING LOWPASS FILTERS FOR DRIVE CONTROL IN CONJUNCTION WITH A HIGH LEVEL OF CONTROL DYNAMICS

FIELD OF THE INVENTION

The invention relates to a drive control for an electric drive with a high level of control dynamics, in the form of a meshed control structure with a rotational speed control loop and with a current control loop arranged inside said loop, the rotational speed control comprising a controller with a proportional component and integral component as well as a downstream filter for suppressing resonances in the controlled system.

BACKGROUND OF THE INVENTION

Parasitic resonances in the controlled system cause problems in the control of machine tools, robots or other production machines, hereinafter machines. These problems are usually rendered harmless by the use of filters. However, even compensation with the aid of filters has problems. The phase consumption of the filters reduces the achievable controller gains, which corresponds to a dynamic loss for the controlled system. This is undesirable particularly in the present-day highly dynamic electric drives, because a portion of the design-induced dynamics available through the drives is lost.

Filters are typically used in rotational speed controls. The illustration according of FIG. 1 shows a block diagram of a control structure for controlling an electric drive. What is shown is a drive control A with a position controller L, a downstream rotational speed controller D and a downstream current controller S with corresponding desired values 1* for the position, n* for the rotational speed and i* for the current. A motor M is controlled thereby via a power supply system LT, an inverter with a rectifier, intermediate voltage circuit and a transducer with power transistors. For positioning purposes, the rotational speed controller D is subordinated to the position controller L for example for a feed drive or a C-axis of the main spindle motor. Corresponding actual current values $i_a$ and $i_b$ are fed back from the power supply system LT to the current controller. The third phase of the three-phase current motor M is calculated. Fitted on the axis of the motor M is a transmitter system with a tachometer G and a position encoder LG, which return an actual rotational speed value n to the rotational speed controller D, and an actual position value 1 to the position controller L.

The illustration in FIG. 2 shows a control loop model of the block diagram system shown in FIG. 1, having a preprocessing unit L to which the desired rotational speed values n* are applied, a rotational speed controller D, and a current controller S, which receives desired current values i* from the rotational speed controller and supplies actual current values i. The latter are fed via a KT element for generating instantaneous values m to the motor M, which generate actual rotational speed values n which are fed back negatively to the input of the rotational speed controller D. The same holds for the actual current values i, which are likewise fed back to the input of the current controller S. Further details of the rotational speed controller D, are shown in FIG. 3. The controller D comprises a PI controller with proportional and integral components, downstream of which the filter F is connected.

In current systems, either individual resonances within such a control loop have been specifically damped by filters F in the form of band-stop filters, or the filter action has been set over a large frequency range by means of a lowpass filter (PT1 or PT2 element) customary in control engineering. FIG. 4 shows the amplitude profile A(f) and the phase profile φ(f) of a band-stop filter, plotted against frequency f. PT1 and PT2 elements cause a reduction in amplitude which increases with rising frequency f and is active even at high frequencies where, because of the lowpass response of electric drives, a reduction would not be necessary. This unnecessary reduction is attended by additional phase losses at low frequencies. This relationship can also be seen from the amplitude profile A(f) and phase profile φ(f), shown in FIG. 5, of a PT2 element.

Damping of individual resonances by means of band-stop filters therefore causes a relatively low phase loss, and thus dynamic losses are not excessively large. However, the robustness of such a solution is poor. This is problem in systems with varying resonances, which can occur, for example, from system aging, alteration of tools or workpieces, altered machine geometry or during the processing stage (tool engagement). Thus the controlled system can become unstable or is poorly damped.

In the direct drives being increasingly used in automation engineering, resonant frequencies frequently vary particularly strongly during the traversing operation, and therefore cannot be sufficiently reduced by band-stop filters. Band-stop filters are therefore not a robust solution to stop these unwanted resonances, since only a narrow frequency range is filtered. In the case of linear drives, the controlled system is mostly characterized by many resonant frequencies which are situated very closely next to one another and can in practice be effectively suppressed only with the aid of lowpass filters.

Conventional lowpass filters admittedly are a robust solution, ensuring stable behavior even in the case of varying resonances, but they cause a substantial loss in dynamics which cannot be tolerated especially in the case of direct drives. Even slight phase drops markedly slow the operation of the controlled system. A relatively large phase loss, such as a loss of 30 degrees, transforms the dynamic, fast drive into a slow system. Because of the severe phase drop, it is therefore necessary to accept a low controller gain and, as a result thereof, an inferior suppression of interference and a slower response to setpoint changes.

SUMMARY OF THE INVENTION

It is therefore an object of the present invention to minimize this loss in dynamics and achieve an optimum in robustness and dynamics. This object is achieved by a drive control for an electric drive with a high level of control dynamics in the form of a meshed control structure which is equipped with a rotational speed control loop and with a current control loop arranged inside said loop. In this arrangement, the rotational speed control comprises a controller with a proportional component and integral component as well as a downstream filter for suppressing resonances in the controlled system, a phase-saving lowpass filter being provided which is tuned to the resonances to be suppressed with regard to frequency range and amplitude reduction. By comparison with the known prior art, therefore, a loss in dynamics is markedly minimized and an optimum is achieved in robustness and dynamics.

A preferred embodiment of the phase-saving filter is achieved by the use of a PDT2 element as lowpass filter. Such a filter can be implemented particularly easily and cost-effectively when the rotational speed control is configured as a digital controller with a processor, such as a digital signal processor or other general purpose processor, which implements the PDT2 element in accordance with the following second order differential equation:

$$u_k = V_F * (e_k + a_1 e_{k-1} + a_0 e_{k-2}) - u_{k-1} b_1 - u_{k-2} b_0,$$

where $u_k$ is the filter output in the computing cycle k, and $e_k$ is the filter input in the computing cycle k.

Alternatively, the use of a Cauer filter as lowpass filter has proved to be preferred, particularly in the use of a second order Cauer filter. Such a filter can be implemented easily and cost-effectively when the rotational speed control is configured as a digital controller with a processor which determines the Cauer filter in accordance with the following second order differential equation:

$$u_k = a_0 u_{k-1} + a_1 u_{k-2} + b_0 e_k + b_1 e_{k-1} + b_2 e_{k-2},$$

where $u_k$ is the filter output in the computing cycle k, and $e_k$ is the filter input in the computing cycle k.

Even more preferred results can be achieved, although with increased computational expenditure, by using an eigth order Cauer as a lowpass filter. In this case, the rotational speed control can likewise be configured as a digital controller with a processor which implements the Cauer filter with the aid of the following eighth order differential equation:

$$u_k = a_0 u_{k-1} + a_1 u_{k-2} + \ldots + a_7 u_{k-7} + b_0 e_k + b_1 e_{k-1} + \ldots + b_8 e_{k-8},$$

where $u_k$ is the filter output in the computing cycle k, and $e_k$ is the filter input in the computing cycle k.

It is therefore possible to achieve decisive advantages over the known prior art with the aid of PT2 elements as lowpass filters by using a PDT2 filter or a Cauer filter to suppress resonances in the controlled system of a control, in particular in a rotational speed control for an electric drive. This is suitable, in particular, for use in numerically controlled machine tools or robots.

BRIEF DESCRIPTION OF THE DRAWINGS

Further advantages and details of the invention are described below in conjunction with the figures, in which.

DETAILED DESCRIPTION OF THE INVENTION

Figure 1:
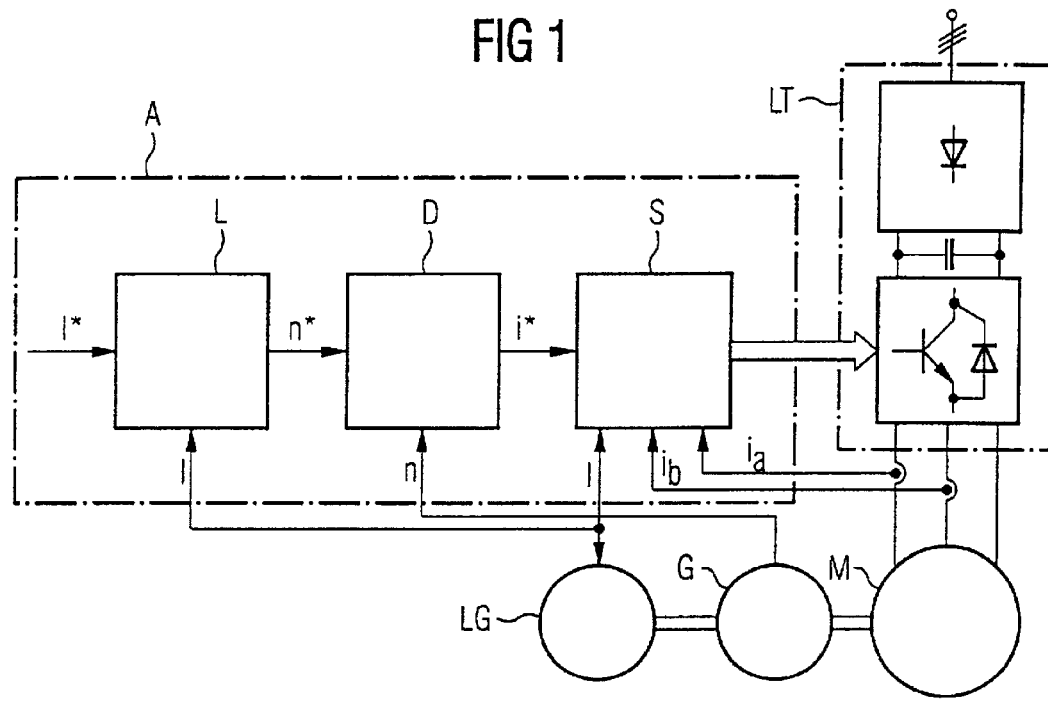
FIG. 1 shows a block diagram of a control structure for controlling an electric drive.
Figure 2:
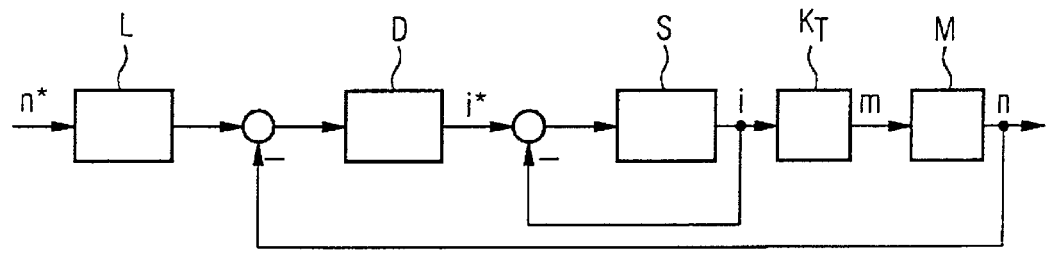
FIG. 2 shows a block diagram control loop model of the system illustrated in FIG. 1.
Figure 3A:
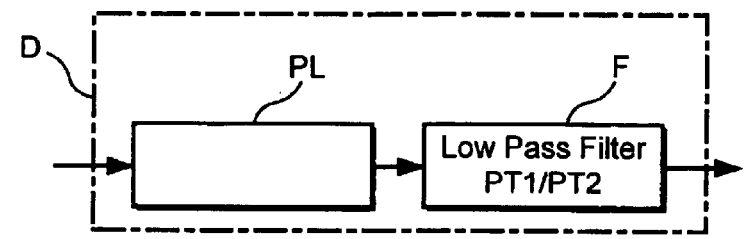
FIG. 3 shows the design of the rotational speed controller.
Figure 3B:
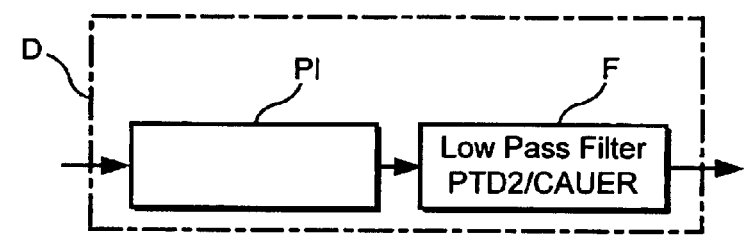
Figure 4:
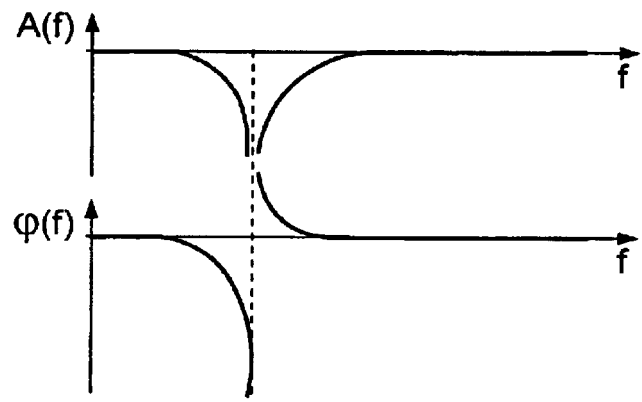
FIG. 4 shows the amplitude profile A(f) and the phase profile φ(f) of a band-stop filter, plotted against frequency f.
Figure 5:
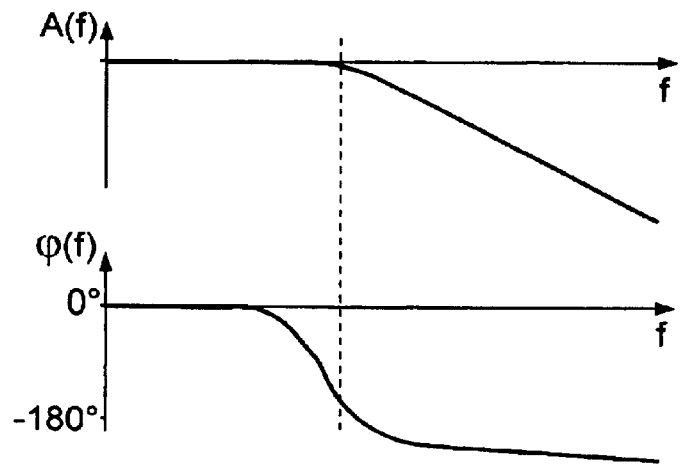
FIG. 5 shows the amplitude profile A(f) and the phase profile φ(f) of a PT2 element, plotted against frequency f.
Figure 6:
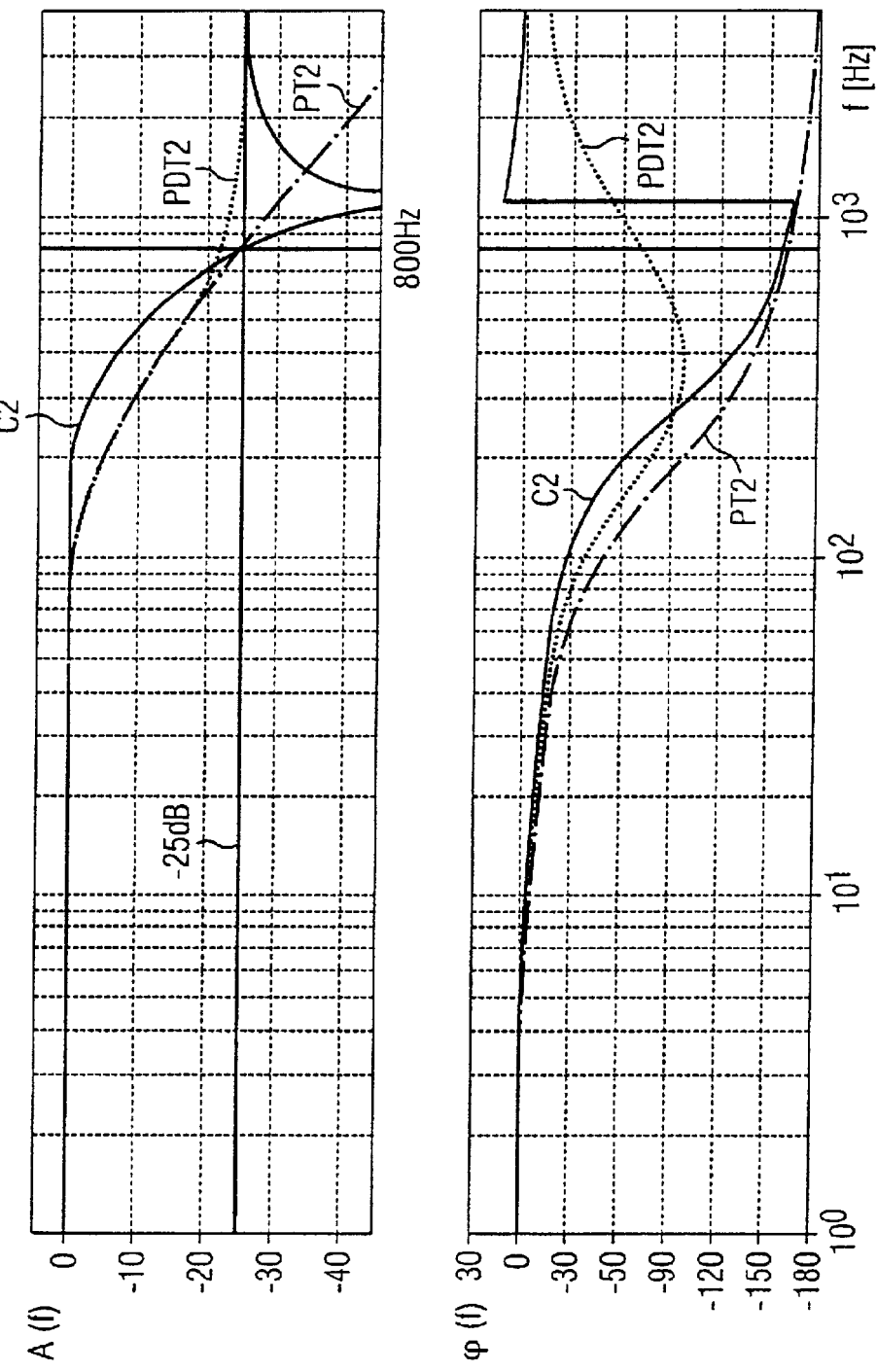
FIG. 6 shows the amplitude profile A(f) and the phase profile φ(f) of a PT2 element compared with the phase-saving filters PDT2 element and Cauer filter of second order, plotted against frequency f.

The filters according to the present invention permit ideal matching with regard to frequency range and amplitude reduction. FIG. 6 shows, by way of example, two of the novel filters of the present invention, specifically a PDT2 element PDT2 (dotted) and a second order Cauer filter C2 (solid), compared with a conventional lowpass filter with PT2 element PT2 (dashed and dotted). In each case, the amplitude profile A(f) and the phase profile φ(f) are plotted against frequency f. All the filters fulfill the requirement of ensuring an amplitude reduction of 25 dB at 800 Hz.

While the PT2 element has a substantial phase drop associated with it, the PDT2 element shown consumes substantially less phase, but nevertheless achieves a sufficient reduction. The Cauer filter of second order shows an even more favorable phase profile than the PDT2 element, since the Cauer filter consumes even less phase. Both, the Cauer filter of second order and the PDT2 element are implemented by a second order differential equation with approximately the same computational outlay required to implement a PT2 element. Such filters have not so far been used in control engineering. The illustrated filters permit robustness and dynamics to be optimally brought together in a specific and systematic fashion. Cauer filters are used in the field of telecommunications engineering, where the steep amplitude drop is significant and not low phase consumption, as in the case of application in control engineering (i.e. a low phase consumption is not significant in telecommunications engineering).

In addition to the small phase drop, the PDT2 element and Cauer filter are easily designed for use in a drive control system. All the parameters of the filter are determined by fixing the desired amplitude drop and the desired frequency range.

The second order Cauer filter can, for example, be implemented with the aid of a digital processor or a suitable ASIC (application-specific integrated circuit) by means of a differential equation using the following algorithm:

$$u_k = a_0 u_{k-1} + a_1 u_{k-2} + b_0 e_k + b_1 e_{k-1} + b_2 e_{k-2}, \quad (1)$$

where $u_k$ is the filter output in the computing cycle k, and $e_k$ is the filter input in the computing cycle k.

The output of a second order Cauer filter is therefore calculated from the two prior filter outputs ($u_{k-1}$, $u_{k-2}$), the current filter input ($e_k$) and the two prior filter inputs ($e_{k-1}$, $e_{k-2}$). The factors a and b are parameters which are calculated from the filter properties desired for the application, such as cutoff frequency and depth of drop, using known algorithms (compare in this regard also Kammeyer/Kroschel: Digitale Signalverarbeitung [digital signal processing], Teubner-Verlag, Stuttgart, 1989, pages 91f., or Schrüfer, E.: Signalverarbeitung; numerische Verarbeitung digitaler Signale [signal processing; numerical processing of digital signals], Hanser-Verlag, Munich, 1990, page 215 and page 220).

Figure 7:
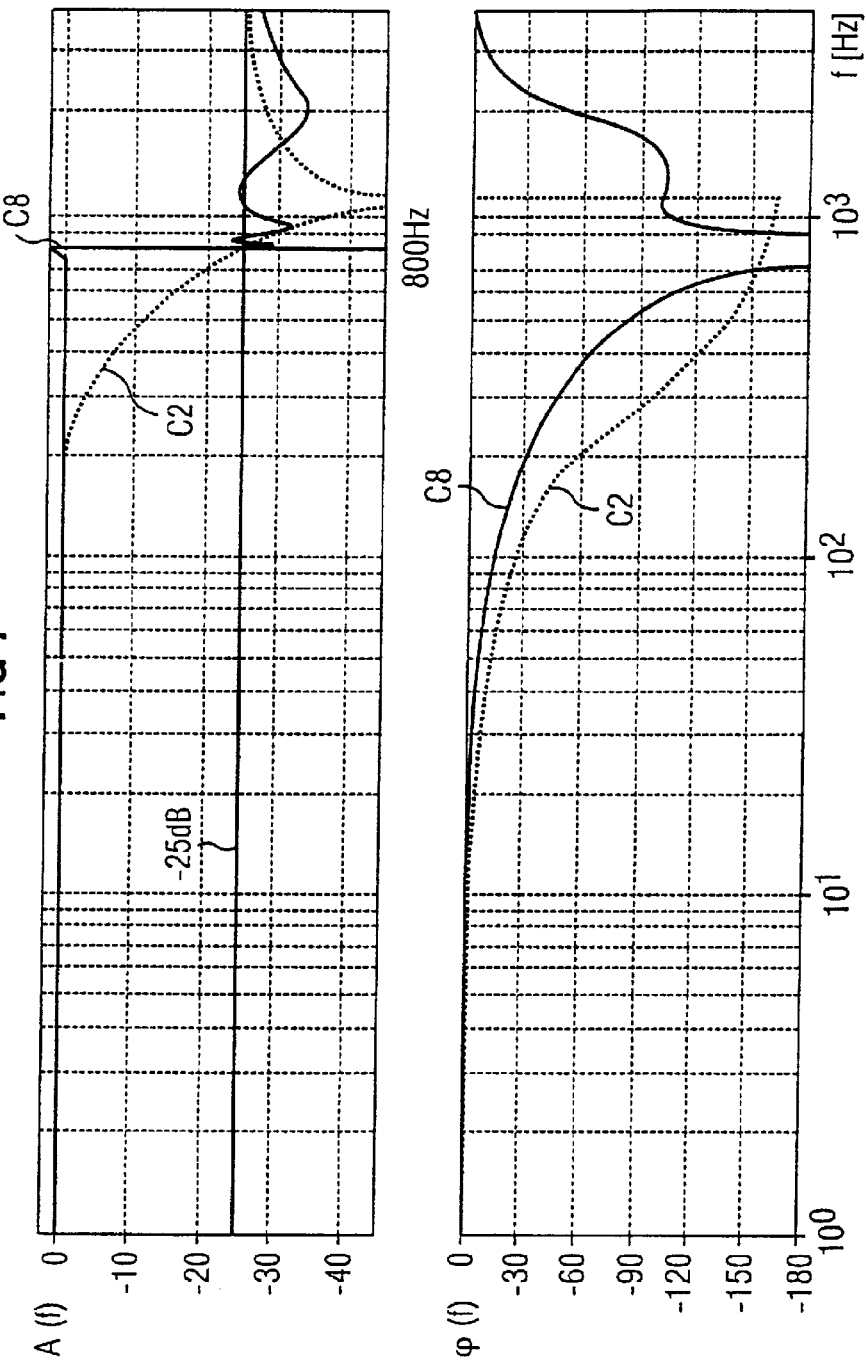
FIG. 7 shows a comparison of the amplitude profile A(f) and the phase profile φ(f) of a Cauer filter of eighth order compared to a Cauer filter of second order, plotted against frequency f.

An eighth order Cauer filter requires more computing expenditure, but offers significantly better phase consumption. This is shown in the comparison illustrated in FIG. 7 between the amplitude profile A(f) and the phase profile φ(f) plotted against the frequency f of an eighth order Cauer filter C8 (solid) and a second order Cauer filter C2 (dotted).

Such an eighth order Cauer filter is produced by superimposing 4 band-stop filters with different numerator and denominator characteristic frequencies. A controller gain higher by at least the factor of 2 compared with the PT2 element can be achieved using such a filter.

An eighth order Cauer filter can be implemented with the aid of a digital processor, in accordance with the following differential equation:

$$u_k = a_0 u_{k-1} + a_1 u_{k-2} + \ldots + a_7 u_{k-7} + b_0 e_k + b_1 e_{k-1} + \ldots + b_8 e_{k-8}, \quad (2)$$

where $u_k$ is the filter output in the computing cycle k, and $e_k$ is the filter input in the computing cycle k.

The corresponding implementation of a PDT2 element can be achieved in this case as follows (assuming that the filter function F(s) is as follows in the continuous range)L $$F(s) = \frac{1 + s\frac{2d_A}{\omega_A} + \frac{s^2}{\omega_A^2}}{1 + s\frac{2d_B}{\omega_B} + \frac{s^2}{\omega_B^2}}, \quad (3)$$

where $$s_{A1/2} = \underbrace{-d_A\omega_A}_{\sigma_A} \pm \underbrace{j\omega_A\sqrt{1-d_A^2}}_{\omega_A}, \quad (4)$$

and $$s_{B1/2} = \underbrace{-d_B\omega_B}_{\sigma_B} \pm \underbrace{j\omega_B\sqrt{1-d_B^2}}_{\omega_B}, \quad (5)$$

$\omega_A$, $\omega_B$ representing angular frequencies, and $d_A$, $d_B$ representing damping values, this yields $$F(z) = \frac{(1-z_B)(1-\bar{z}_B)}{\underbrace{(1-z_A)(1-\bar{z}_A)}_{V_F}} \circ \frac{(z-z_A)(z-\bar{z}_A)}{(z-z_B)(z-\bar{z}_B)} \quad (6)$$

for the time-discrete range, where $$Z_{A,B} = e^{\sigma_{A,B}T} \cdot (\cos \omega_{A,B}T + j \sin \omega_{A,B}T) \quad (7)$$

in which case $z = e^{sT}$, with s as Laplace operator and $\bar{z}$ being the conjugate complex value of z.

The result upon multiplying out the filter is therefore $$F(z) = \frac{z^2 + z \cdot \overbrace{(-2\mathrm{Re}(z_A))}^{a_1} + \overbrace{|z_A|^2}^{a_0}}{z^2 + z \cdot \underbrace{(-2\mathrm{Re}(z_B))}_{b_1} + \underbrace{|z_B|^2}_{b_0}} \cdot V_F, \quad (8)$$

where $$a_1 = -2\sigma_A T \cdot \cos \omega_A T \quad (9)$$

$$a_0 = e^{2\sigma_A T} \quad (10)$$

$$b_1 = -2\sigma_B T \cdot \cos \omega_B T \quad (11)$$

$$b_0 = e^{2\sigma_B T} \quad (12)$$

The following ratio of the output variable of the filter $u_k$ to the input variable of the filter $e_k$ can now be derived therefrom:

$$\frac{u_k}{e_k} = F(z) = V_F \cdot \frac{1 + a_1 z^{-1} + a_0 z^{-2}}{1 + b_1 z^{-1} + b_0 z^{-2}}. \quad (13)$$

This, in turn, results in the following differential equation for implementing a second order PDT2 element with the aid of a processor:

$$u_k = V_F^*(e_k + a_1 e_{k-1} + a_0 e_{k-2}) - u_{k-1} b_1 - u_{k-2} b_0, \quad (14)$$

where $u_k$ is the filter output in the computing cycle k, and $e_k$ is the filter input in the computing cycle k.

In this case, an amplitude reduction begins approximately at the angular frequency $\omega_A$, and the level of the reduction is determined by the ratio $(\omega_A/\omega_B)^2$. The two damping parameters $d_A$, $d_B$ are preferably given a value of between 0.6 and 0.7.

The PDT2 filtering element and Cauer filter according to the invention therefore provide, for tasks of control engineering, the advantage of a greater robustness, since a wider frequency range is filtered, and a substantially smaller phase drop than conventional lowpass filters. These filters have already been used successfully in tests in the case of various control applications. For example, for grinding machines, whose system parameters vary owing to the changing of tools and workpieces, it was possible to achieve a robust and dynamic setting only with the aid of Cauer filters or a PDT2 filtering element.

The foregoing merely illustrates the principles of the invention in exemplary embodiments. Various modifications and alterations to the described embodiments will be apparent to those skilled in the art in view of the teachings herein. It will thus be fully appreciated that those skilled in the art will be able to devise numerous systems and methods which, although not explicitly shown or described, embody the principles of the invention and thus are within the spirit and scope of the invention as defined in the appended claims.

We claim:

1. A drive control for an electric drive having a high level of control dynamics in the form of a meshed control structure comprising a rotational speed control loop, a current control loop arranged inside said rotational speed control loop, the rotational speed control loop comprising a controller with a proportional component and integral component and a phase saving lowpass filter selected from the group consisting of a PDT2 element and a Cauer filter for suppressing resonances in the controlled system, said filter tuned to the resonances to be suppressed with regard to frequency range and amplitude reduction, wherein said filter filters a range of frequencies wider than conventional lowpass filters, and with a substantially smaller phase drop; and wherein the PDT2 element utilizes the following second order differential equation:

$$u_k = V_F^*(e_k + a_1 e_{k-1} + a_0 e_{k-2}) - u_{k-1} b_1 - u_{k-2} b_0,$$

where $u_k$ is the filter output in the computing cycle k, and $e_k$ is the filter input in the computing cycle k; further wherein the Cauer filter is selected from the group consisting of a second order and an eighth order, and wherein as to the later utilizes the eighth order differential equation:

$$u_k = a_0 u_{k-1} + a_1 u_{k-2} + \ldots + a_7 u_{k-7} + b_0 e_k + b_1 e_{k-1} + \ldots + b_8 e_{k-8},$$

where $u_k$ is the filter output in the computing cycle k, and $e_k$ is the filter input in the computing cycle k.

2. The drive control according to claim 1, wherein said electric drive drives a device selected from the group consisting of a numerically controlled machine tool and a robot.

3. A method for suppressing resonances in a controlled system of a control for an electric drive comprising using a PDT2 filtering element in the control system, wherein said filter filters a range of frequencies wider than conventional lowpass filters, and with a substantially smaller phase drop, wherein and the PDT2 element of a second order and utilizes the following second order differential equation:

$$u_k = V_F^* (e_k + a_1 e_{k-1} + a_0 e_{k-2}) - u_{k-1} b_1 - u_{k-2} b_0,$$

where $u_k$ is the filter output in the computing cycle k, and $e_k$ is the filter input in the computing cycle k.

4. A method for suppressing resonances in a controlled system of a rotational speed control for an electric drive comprising using a PDT2 filtering element in the control system, wherein said filter filters a range of frequencies wider than conventional lowpass filters, and with a substantially smaller phase drop, and wherein the PDT2 element is of a second order and utilizes the following second order differential equation:

$$u_k = V_F * (e_k + a_1 e_{k-1} + a_0 e_{k-2}) - u_{k-1} b_1 - u_{k-2} b_0,$$

where $u_k$ is the filter output in the computing cycle k, and $e_k$ is the filter input in the computing cycle k.

5. A method for suppressing resonances in a controlled system of a control for an electric drive comprising using a Cauer filter in the control system, wherein said filter filters a range of frequencies wider than conventional lowpass filters, and with a substantially smaller phase drop, wherein the Cauer filter is selected from a second order and an eighth order and wherein the eighth order differential equation:

$$u_k = a_0 u_{k-1} + a_1 u_{k-2} + \ldots + a_7 u_{k-7} + b_0 e_k + b_1 e_{k-1} + \ldots + b_8 e_{k-8},$$

where $u_k$ is the filter output in the computing cycle k, and $e_k$ is the filter input in the computing cycle k.

6. A method for suppressing resonances in a controlled system of a rotational speed control for an electric drive comprising using a Cauer filter in the control system, wherein said filter filters a range of frequencies wider than conventional lowpass filters, and with a substantially smaller phase drop; wherein, wherein the Cauer filter is selected from a second order and an eighth order and wherein the eighth order differential equation is:

$$u_k = a_0 u_{k-1} + a_1 u_{k-2} + \ldots + a_7 u_{k-7} + b_0 e_k + b_1 e_{k-1} + \ldots + b_0 e_{k-8},$$

where $u_k$ is the filter output in the computing cycle k, and $e_k$ is the filter input in the computing cycle k.

* * * * *